(12) United States Patent
Martch

(10) Patent No.: US 10,432,296 B2
(45) Date of Patent: Oct. 1, 2019

(54) INTER-RESIDENCE COMPUTING RESOURCE SHARING

(71) Applicant: DISH Technologies L.L.C., Englewood, CO (US)

(72) Inventor: Henry Gregg Martch, Parker, CO (US)

(73) Assignee: DISH Technologies L.L.C., Englewood, CO (US)

( * ) Notice: Subject to any disclaimer, the term of this patent is extended or adjusted under 35 U.S.C. 154(b) by 15 days.

(21) Appl. No.: 14/981,509

(22) Filed: Dec. 28, 2015

(65) Prior Publication Data

US 2016/0191147 A1 Jun. 30, 2016

Related U.S. Application Data

(60) Provisional application No. 62/098,896, filed on Dec. 31, 2014.

(51) Int. Cl.
*G06F 3/00* (2006.01)
*G06F 13/00* (2006.01)
(Continued)

(52) U.S. Cl.
CPC ..... *H04B 7/18526* (2013.01); *H04N 21/2543* (2013.01); *H04N 21/4263* (2013.01);
(Continued)

(58) Field of Classification Search
CPC .......... H04B 7/18526; H04N 21/2543; H04N 21/4263; H04N 21/43615; H04N 21/6143; H04N 21/632
See application file for complete search history.

(56) References Cited

U.S. PATENT DOCUMENTS 6,005,562 A 12/1999 Shiga et al.
6,177,931 B1 1/2001 Alexander et al.
(Continued)

FOREIGN PATENT DOCUMENTS

EP 1 865 716 A2 12/2007
EP 2 309 733 B1 4/2011
(Continued)

OTHER PUBLICATIONS

U.S. Appl. No. 13/801,932, filed Mar. 13, 2013 Notice of Allowance dated Nov. 25, 2016, all pages.
(Continued)

*Primary Examiner* — Kyu Chae
(74) *Attorney, Agent, or Firm* — Kilpatrick Townsend & Stockton LLP

(57) ABSTRACT

Systems and methods for enabling computing device or system resource sharing between two or more satellite television customers are disclosed. This may be achieved by partitioning resources of a television receiver system such that a first party and at least a second party have access to the various features or functionality in a manner similar to that as if each respective party has a standalone instance of the same. A server system may facilitate the resource sharing between satellite television customers by receiving a request from a first party and identifying a second party within suitable distance from the first party. The server system may send configuration instructions to the television receiver of the hosting party that include instructions as to how the resources of the computing system are to be allocated.

20 Claims, 6 Drawing Sheets

(51) Int. Cl.

| | |
|---|---|
| *H04N 5/445* | (2011.01) |
| *H04N 7/16* | (2011.01) |
| *H04N 7/18* | (2006.01) |
| *H04N 7/173* | (2011.01) |
| *H04B 7/185* | (2006.01) |
| *H04N 21/61* | (2011.01) |
| *H04N 21/436* | (2011.01) |
| *H04N 21/2543* | (2011.01) |
| *H04N 21/426* | (2011.01) |
| *H04N 21/63* | (2011.01) |

(52) U.S. Cl.
 CPC ... *H04N 21/43615* (2013.01); *H04N 21/6143* (2013.01); *H04N 21/632* (2013.01)

(56) References Cited

U.S. PATENT DOCUMENTS

| | | |
|---|---|---|
| 6,681,396 B1 | 1/2004 | Bates et al. |
| 6,774,924 B2 | 8/2004 | Kato et al. |
| 7,174,512 B2 | 2/2007 | Martin et al. |
| 7,197,715 B1 | 3/2007 | Valeria |
| 7,633,887 B2 | 12/2009 | Panwar et al. |
| 7,680,894 B2 | 3/2010 | Diot et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,849,487 B1 | 12/2010 | Vosseller |
| 8,024,753 B1 | 9/2011 | Kummer et al. |
| 8,046,798 B1 | 10/2011 | Schlack et al. |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,424,041 B2 | 4/2013 | Candelore et al. |
| 8,427,356 B1 | 4/2013 | Satish |
| 8,627,349 B2 | 1/2014 | Kirby et al. |
| 8,667,527 B2 | 3/2014 | Yan et al. |
| 8,689,258 B2 | 4/2014 | Kemp |
| 8,752,084 B1 | 6/2014 | Lai et al. |
| 8,799,977 B1 * | 8/2014 | Kapner, III ...... H04N 21/23113 709/212 |
| 8,855,681 B1 | 10/2014 | George et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,264,779 B2 | 2/2016 | Kirby et al. |
| 9,269,397 B2 | 2/2016 | Casagrande et al. |
| 9,288,551 B2 | 3/2016 | Kummer |
| 9,420,333 B2 | 8/2016 | Martch et al. |
| 9,426,516 B2 | 8/2016 | Kemp |
| 9,565,474 B2 | 2/2017 | Petruzzelli et al. |
| 9,602,875 B2 | 3/2017 | Hussain |
| 9,609,379 B2 | 3/2017 | Martch et al. |
| 9,621,960 B2 | 4/2017 | Hardy et al. |
| 9,681,176 B2 | 6/2017 | Mountain |
| 9,681,196 B2 | 6/2017 | Mountain |
| 9,769,540 B2 | 9/2017 | Kummer |
| 9,800,938 B2 | 10/2017 | Keipert |
| 9,848,249 B2 | 12/2017 | Freed et al. |
| 9,930,404 B2 | 3/2018 | Friedrich et al. |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0090198 A1 | 7/2002 | Rosenberg et al. |
| 2002/0164155 A1 | 11/2002 | Mate |
| 2002/0166122 A1 | 11/2002 | Kikinis et al. |
| 2002/0174430 A1 | 11/2002 | Ellis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066076 A1 | 4/2003 | Minahan |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0154485 A1 * | 8/2003 | Johnson ............... G11B 27/034 725/89 |
| 2003/0172376 A1 | 9/2003 | Coffin, III |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0019489 A1 | 1/2004 | Funk et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0091690 A1 | 4/2005 | Delpuch et al. |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0180568 A1 | 8/2005 | Krause |
| 2005/0191041 A1 | 9/2005 | Braun et al. |
| 2005/0240961 A1 | 10/2005 | Jerding et al. |
| 2005/0264705 A1 | 12/2005 | Kitamura |
| 2005/0275758 A1 * | 12/2005 | McEvilly ........... H04N 7/17318 348/725 |
| 2006/0020962 A1 | 1/2006 | Stark et al. |
| 2006/0085828 A1 | 4/2006 | Dureau et al. |
| 2006/0089870 A1 | 4/2006 | Myhr |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde, Jr. |
| 2007/0033616 A1 | 2/2007 | Gutta |
| 2007/0058930 A1 | 3/2007 | Iwamoto |
| 2007/0061830 A1 | 3/2007 | Chang |
| 2007/0074256 A1 | 3/2007 | Jung et al. |
| 2007/0079342 A1 | 4/2007 | Ellis et al. |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0157281 A1 | 7/2007 | Ellis et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0204302 A1 | 8/2007 | Calzone |
| 2007/0226766 A1 | 9/2007 | Poslinski et al. |
| 2007/0245379 A1 | 10/2007 | Agnihortri |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0086743 A1 | 4/2008 | Cheng et al. |
| 2008/0097949 A1 | 4/2008 | Kelly et al. |
| 2008/0109307 A1 | 5/2008 | Ullah |
| 2008/0134043 A1 | 6/2008 | Georgis et al. |
| 2008/0163305 A1 | 7/2008 | Johnson et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0244678 A1 | 10/2008 | Kim et al. |
| 2008/0270038 A1 | 10/2008 | Partovi et al. |
| 2008/0282312 A1 * | 11/2008 | Blinnikka ............. H04N 5/765 725/153 |
| 2008/0300982 A1 | 12/2008 | Larson et al. |
| 2008/0305832 A1 * | 12/2008 | Greenberg ............ H04W 8/18 455/557 |

(56) References Cited

U.S. PATENT DOCUMENTS

| | | |
|---|---|---|
| 2008/0320523 A1 | 12/2008 | Morris et al. |
| 2009/0044217 A1 | 2/2009 | Lutterbach et al. |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0150941 A1 | 6/2009 | Riedl et al. |
| 2009/0178071 A1 | 7/2009 | Whitehead |
| 2009/0210898 A1 | 8/2009 | Childress et al. |
| 2009/0217332 A1 | 8/2009 | Hindle et al. |
| 2009/0228911 A1 | 9/2009 | Vrijsen |
| 2009/0234828 A1 | 9/2009 | Tu |
| 2009/0249412 A1 | 10/2009 | Bhogal et al. |
| 2009/0276803 A1 | 11/2009 | Weaver |
| 2009/0282445 A1* | 11/2009 | Yang .................. H04L 12/2818 725/93 |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0031306 A1 | 2/2010 | Pandey et al. |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0083327 A1 | 4/2010 | Toba et al. |
| 2010/0089996 A1 | 4/2010 | Koplar |
| 2010/0115554 A1 | 5/2010 | Drouet et al. |
| 2010/0122294 A1 | 5/2010 | Craner |
| 2010/0125864 A1 | 5/2010 | Dwyer et al. |
| 2010/0146560 A1 | 6/2010 | Bonfrer |
| 2010/0153983 A1 | 6/2010 | Philmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0268779 A1* | 10/2010 | Rao ..................... H04L 65/601 709/206 |
| 2010/0269144 A1 | 10/2010 | Forsman et al. |
| 2010/0272257 A1 | 10/2010 | Beals |
| 2010/0305729 A1 | 12/2010 | Glitsch et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0109801 A1 | 5/2011 | Thomas et al. |
| 2011/0173337 A1 | 7/2011 | Walsh et al. |
| 2011/0191417 A1 | 8/2011 | Rathod |
| 2011/0202956 A1 | 8/2011 | Connelly et al. |
| 2011/0206342 A1 | 8/2011 | Thompson et al. |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2011/0295667 A1 | 12/2011 | Butler |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0066722 A1* | 3/2012 | Cheung ................ H04M 1/7253 725/62 |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0129479 A1* | 5/2012 | Kanojia ................ H04H 20/57 455/230 |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0260295 A1 | 10/2012 | Rondeau |
| 2012/0278834 A1 | 11/2012 | Richardson |
| 2012/0278837 A1 | 11/2012 | Curtis et al. |
| 2012/0284745 A1 | 11/2012 | Strong |
| 2012/0295560 A1 | 11/2012 | Mufti |
| 2012/0311633 A1 | 12/2012 | Mandrekar et al. |
| 2013/0014159 A1 | 1/2013 | Wiser et al. |
| 2013/0031216 A1 | 1/2013 | Willis et al. |
| 2013/0042280 A1 | 2/2013 | Chen |
| 2013/0055304 A1 | 2/2013 | Kirby et al. |
| 2013/0061313 A1 | 3/2013 | Cullimore et al. |
| 2013/0071090 A1 | 3/2013 | Berkowitz et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0145023 A1 | 6/2013 | Li et al. |
| 2013/0174196 A1 | 7/2013 | Herlein |
| 2013/0194503 A1 | 8/2013 | Yamashita |
| 2013/0232148 A1 | 9/2013 | MacDonald et al. |
| 2013/0243398 A1 | 9/2013 | Templeman et al. |
| 2013/0263189 A1 | 10/2013 | Garner |
| 2013/0268951 A1 | 10/2013 | Wyatt et al. |
| 2013/0283162 A1 | 10/2013 | Aronsson et al. |
| 2013/0291037 A1 | 10/2013 | Im et al. |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0067998 A1 | 3/2014 | Garcia et al. |
| 2014/0068675 A1 | 3/2014 | Mountain |
| 2014/0068692 A1 | 3/2014 | Archibong et al. |
| 2014/0114966 A1 | 4/2014 | Bilinski et al. |
| 2014/0123160 A1 | 5/2014 | van Coppenolle et al. |
| 2014/0139555 A1 | 5/2014 | Levy |
| 2014/0139733 A1* | 5/2014 | MacInnis ............. H04N 19/124 348/441 |
| 2014/0140680 A1 | 5/2014 | Jo |
| 2014/0150009 A1 | 5/2014 | Sharma |
| 2014/0153904 A1 | 6/2014 | Adimatyam et al. |
| 2014/0157324 A1* | 6/2014 | Mao ........................ G06F 16/14 725/54 |
| 2014/0157327 A1 | 6/2014 | Roberts et al. |
| 2014/0157339 A1* | 6/2014 | Zhang ................ H04N 21/4126 725/110 |
| 2014/0215539 A1 | 7/2014 | Chen et al. |
| 2014/0247931 A1 | 9/2014 | Swamy et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0150052 A1 | 5/2015 | Errico et al. |
| 2015/0181132 A1 | 6/2015 | Kummer et al. |
| 2015/0181279 A1 | 6/2015 | March et al. |
| 2015/0229981 A1 | 8/2015 | Williams et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2015/0334461 A1 | 11/2015 | Yu |
| 2016/0066020 A1 | 3/2016 | Mountain |

(56) References Cited

U.S. PATENT DOCUMENTS

| | | | |
|---|---|---|---|
| 2016/0066026 | A1 | 3/2016 | Mountain |
| 2016/0066049 | A1 | 3/2016 | Mountain |
| 2016/0066056 | A1 | 3/2016 | Mountain |
| 2016/0073172 | A1 | 3/2016 | Sharples |
| 2016/0088351 | A1 | 3/2016 | Petruzzelli et al. |
| 2016/0191147 | A1 | 6/2016 | Martch |
| 2016/0198229 | A1 | 7/2016 | Keipert |
| 2016/0309212 | A1 | 10/2016 | Martch et al. |
| 2017/0111696 | A1 | 4/2017 | Petruzzelli et al. |
| 2017/0213243 | A1 | 7/2017 | Dollard |
| 2018/0070132 | A1 | 3/2018 | Friedrich et al. |

FOREIGN PATENT DOCUMENTS

| | | | |
|---|---|---|---|
| EP | 2 403 239 | A1 | 1/2012 |
| FR | 2 902 568 | A1 | 12/2007 |
| JP | H10 322622 | A | 12/1998 |
| JP | 2006-245745 | A | 9/2006 |
| KR | 2004 0025073 | A | 3/2004 |
| KR | 2006 0128295 | A | 12/2006 |
| WO | 98/37694 | A1 | 8/1998 |
| WO | 2004/068386 | A1 | 8/2004 |
| WO | 2005/059807 | A2 | 6/2005 |
| WO | 2007/064987 | A2 | 7/2007 |
| WO | 2007/098067 | A1 | 8/2007 |
| WO | 2009/073925 | A1 | 6/2009 |
| WO | 2011/040999 | A1 | 4/2011 |
| WO | 2013/016626 | A1 | 1/2013 |
| WO | 2014/072742 | A1 | 5/2014 |
| WO | 2014/164782 | A1 | 10/2014 |
| WO | 2014/179017 | A1 | 11/2014 |
| WO | 2016/030384 | | 3/2016 |
| WO | 2016/030477 | A1 | 3/2016 |
| WO | 2016/034899 | A1 | 3/2016 |
| WO | 2016/055761 | A1 | 4/2016 |

OTHER PUBLICATIONS

U.S. Appl. No. 14/470,248, filed Aug. 27, 2014, Final Office Action dated Dec. 9, 2016, all pages.
U.S. Appl. No. 14/470,279, filed Aug. 27, 2014, Final Office Action dated Dec. 9, 2016, all pages.
U.S. Appl. No. 14/479,007, filed Sep. 5, 2014, Final Office Action dated Jan. 23, 2017, all pages.
U.S. Appl. No. 14/591,474, filed Jan. 7, 2015, Non-Final Office Action dated Dec. 16, 2016, 32 pages.
U.S. Appl. No. 13/834,916, filed Mar. 15, 2013 Final Office Action dated Mar. 13, 2017, all pages.
U.S. Appl. No. 14/297,279, filed Jun. 5, 2014 Non-Final Office Action dated Feb. 9, 2017, all pages.
U.S. Appl. No. 14/470,279, filed Aug. 27, 2014, Notice of Allowance dated Mar. 16, 2017, all pages.
U.S. Appl. No. 15/195,527, filed Jun. 28, 2016, Notice of Allowance dated Feb. 3, 2017, all pages.
U.S. Appl. No. 14/139,299, filed Dec. 23, 2013, Final Office Action dated Feb. 30, 2017, all pages.
U.S. Appl. No. 14/470,392, filed Aug. 27, 2014, Notice of Allowance dated Feb. 13, 2017, all pages.
U.S. Appl. No. 14/470,352, filed Aug. 27, 2014 Non Final Office Action dated Nov. 20, 2015, 28 pages.
U.S. Appl. No. 14/470,352, filed Aug. 27, 2014 Final Office Action dated Mar. 17, 2016, all pages.
U.S. Appl. No. 14/470,352, filed Aug. 27, 2014 Non Final Office Action dated Aug. 26, 2016, all pages.
U.S. Appl. No. 14/470,352, filed Aug. 27, 2014 Notice of Allowance dated Dec. 2, 2016, all pages.
U.S. Appl. No. 13/030,905, filed Feb. 18, 2011, Non Final Office Action dated Feb. 15, 2013, all pages.
U.S. Appl. No. 13/030,905, filed Feb. 18, 2011, Notice of Allowance dated Jul. 16, 2013, all pages.
U.S. Appl. No. 14/136,301, filed Dec. 20, 2013, Non Final Office Action dated Jul. 9, 2015, all pages.
U.S. Appl. No. 14/136,301, filed Dec. 20, 2013, Final Office Action dated Dec. 22, 2015, all pages.
U.S. Appl. No. 14/136,301, filed Dec. 20, 2013, Notice of Allowance dated May 10, 2016, all pages.
U.S. Appl. No. 15/243,774, filed Aug. 22, 2016, Non Final Office Action dated Jan. 26, 2017, all pages.
International Search Report and Written Opinion for PCT/GB2015/052457 dated Nov. 13, 2015, 11 pages.
International Preliminary Report on Patentability for PCT/GB2015/052457 dated Feb. 28, 2017, all pages.
International Preliminary Report on Patentability for PCT/GB2015/052456 dated Feb. 28, 2017, all pages.
International Search Report and Written Opinion for PCT/GB2015/052456 dated Jun. 13, 2016, all pages.
U.S. Appl. No. 13/834,916, filed Mar. 15, 2013 Non-Final Rejection dated Aug. 18, 2016, all pages.
U.S. Appl. No. 14/470,248, filed Aug. 27, 2014, Non Final Office Action dated Jul. 25, 2016, all pages.
U.S. Appl. No. 14/470,279, filed Aug. 27, 2014, Non Final Office Action dated Jul. 19, 2016, all pages.
U.S. Appl. No. 14/479,007, filed Sep. 5, 2014, Non-Final Office Action dated Jul. 27, 2016, 37 pages.
U.S. Appl. No. 13/942,451, filed Jul. 15, 2013 Final Office Action dated Jun. 22, 2016, all pages.
U.S. Appl. No. 13/919,702, filed Jun. 17, 2013 Non Final Office Action dated Jun. 30, 2016, all pages.
U.S. Appl. No. 14/139,299, filed Dec. 23, 2013, Non Final Office Action dated Jun. 20, 2016, all pages.
U.S. Appl. No. 14/470,392, filed Aug. 27, 2014 Non-Final Office Action dated Aug. 5, 2016, all pages.
U.S. Appl. No. 13/801,932, filed Mar. 13, 2013 Non-Final Rejection dated May 20, 2016, 28 pages.
U.S. Appl. No. 14/200,864, filed Mar. 7, 2014 Notice of Allowance dated Sep. 15, 2016, all pages.
U.S. Appl. No. 14/470,415, filed Aug. 27, 2014 Non Final Office Action dated Jul. 29, 2016, all pages.
U.S. Appl. No. 15/195,527, filed Jun. 28, 2016, Non-Final Rejection dated Sep. 30, 2016, all pages.
U.S. Appl. No. 13/942,451, filed Jul. 15, 2013 Non Final Office Action dated Oct. 25, 2016, all pages.
U.S. Appl. No. 13/919,702, filed Jun. 17, 2013 Final Office Action dated Oct. 28, 2016, all pages.
U.S. Appl. No. 14/297,279, filed Jun. 5, 2014 Final Rejection dated Apr. 22, 2016, 33 pages.
U.S. Appl. No. 14/139,420, filed Dec. 23, 2013 Notice of Allowance dated Mar. 31, 2016, 37 pages.
U.S. Appl. No. 14/470,392, filed Aug. 27, 2014 Final Office Action dated Mar. 4, 2016, all pages.
U.S. Appl. No. 14/470,415, filed Aug. 27, 2014 Final Office Action dated Mar. 3, 2016, all pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
Extended European Search Report for EP 14160140.1 dated Jul. 7, 2014, 7 pages.
Office Action for EP 14160140.1 dated Jan. 19, 2016, 5 pages.
European Search Report for EP 14197940.1 dated Apr. 28, 2015, 13 pages.
Extended European Search Report for EP 11166892.7 dated Oct. 6, 2011, 7 pages.
International Search Report and Written Opinion for PCT/US2014/023466 dated Jul. 10, 2014, 15 pages.
International Preliminary Report on Patentability for PCT/US2014/023466 dated Sep. 15, 2015, 8 pages.

(56) References Cited

OTHER PUBLICATIONS

International Search Report and Written Opinion for PCT/EP2015/069461 dated Oct. 1, 2015, 13 pages.
International Search Report and Written Opinion for PCT/EP2015/069456 dated Oct. 5, 2015, all pages.
International Search Report and Written Opinion of PCT/US2014/033796 dated Sep. 5, 2014, 12 pages.
International Preliminary Report on Patentability for PCT/US2014/033796 dated Nov. 3, 2015, all pages.
International Search Report and Written Opinion for PCT/EP2015/069681 dated Nov. 23, 2015, 12 pages.
International Search Report and Written Opinion for PCT/GB2015/052570 dated Dec. 11, 2015, 13 pages.
U.S. Appl. No. 13/801,932, filed Mar. 13, 2013 Non Final Office Action dated Jun. 24, 2015, 21 pages.
U.S. Appl. No. 13/801,932, filed Mar. 13, 2013 Final Office Action dated Dec. 17, 2015, 23 pages.
U.S. Appl. No. 13/834,916, filed Mar. 15, 2013 Non Final Office Action dated Aug. 8, 2014, 19 pages.
U.S. Appl. No. 13/834,916, filed Mar. 15, 2013 Final Office Action dated Jan. 12, 2015, 22 pages.
U.S. Appl. No. 13/834,916, filed Mar. 15, 2013 Non Final Office Action dated Apr. 27, 2015, 22 pages.
U.S. Appl. No. 13/834,916, filed Mar. 15, 2013 Final Office Action dated Dec. 14, 2015, 31 pages.
U.S. Appl. No. 14/297,322, filed Jun. 5, 2014 Notice of Allowance dated Nov. 5, 2015, 34 pages.
U.S. Appl. No. 14/297,279, filed Jun. 5, 2014 Non-Final Office Action dated Nov. 5, 2015, 45 pages.
U.S. Appl. No. 14/200,864, filed Mar. 7, 2014, Non-Final Office Action dated Dec. 5, 2014, 35 pages.
U.S. Appl. No. 14/200,864, filed Mar. 7, 2014 Final Office Action dated Jun. 18, 2015, 36 pages.
U.S. Appl. No. 14/200,864, filed Mar. 7, 2014 Non-Final Office Action dated Feb. 18, 2016, 61 pages.
U.S. Appl. No. 13/886,873, filed May 3, 2013, Notice of Allowance dated Oct. 24, 2014, 40 pages.
U.S. Appl. No. 14/470,248, filed Aug. 27, 2014, Preinterview first office action dated Sep. 4, 2015, 22 pages.
U.S. Appl. No. 14/470,248, filed Aug. 27, 2014, Final Office Action dated Feb. 16, 2016, 26 pages.
U.S. Appl. No. 14/470,279, filed Aug. 27, 2014, Preinterview first office action dated Aug. 26, 2015, 23 pages.
U.S. Appl. No. 14/470,279, filed Aug. 27, 2014, Final Office Action dated Jan. 22, 2016, 25 pages.
U.S. Appl. No. 14/479,007, filed Sep. 5, 2014, Non-Final Office Action dated Sep. 1, 2015, 44 pages.
U.S. Appl. No. 14/479,007, filed Sep. 5, 2014, Final Office Action dated Feb. 22, 2016, 37 pages.
U.S. Appl. No. 14/591,474, filed Jan. 7, 2015, Non-Final Office Action dated Feb. 12, 2016, 32 pages.
U.S. Appl. No. 14/494,079, filed Sep. 23, 2014, Preinterview first office action dated Feb. 10, 2016, 6 pages.
U.S. Appl. No. 14/095,860, filed Dec. 3, 2013 Non-Final Office Action dated Dec. 26, 2014, 45 pages.
U.S. Appl. No. 14/095,860, filed Dec. 3, 2013 Final Office Action dated May 1, 2015, 18 pages.
U.S. Appl. No. 14/095,860, filed Dec. 3, 2013 Notice of Allowance dated Jul. 13, 2015, 31 pages.
U.S. Appl. No. 14/095,860, filed Dec. 3, 2013 Notice of Allowance dated Oct. 19, 2015, 14 pages.
U.S. Appl. No. 13/942,451, filed Jul. 15, 2013 Final Office Action dated Apr. 30, 2015, 33 pages.
U.S. Appl. No. 13/942,451, filed Jul. 15, 2013 Non Final Office Action dated Jul. 28, 2014, 27 pages.
U.S. Appl. No. 13/942,451, filed Jul. 15, 2013 Non Final Office Action dated Jan. 8, 2016, 41 pages.
U.S. Appl. No. 13/919,702, filed Jun. 17, 2013 Non Final Office Action dated Jun. 11, 2014, 25 pages.
U.S. Appl. No. 13/919,702, filed Jun. 17, 2013 Final Office Action dated Nov. 18, 2014, 24 pages.
U.S. Appl. No. 13/919,702, filed Jun. 17, 2013 Non-Final Office Action dated Apr. 30, 2015, 26 pages.
U.S. Appl. No. 13/919,702, filed Jun. 17, 2013 Final Office Action dated Dec. 31, 2015, 30 pages.
U.S. Appl. No. 13/971,579, filed Aug. 20, 2013 Non Final Office Action dated Oct. 28, 2014, 35 pages.
U.S. Appl. No. 13/971,579, filed Aug. 20, 2013 Notice of Allowance dated Feb. 27, 2015, 28 pages.
U.S. Appl. No. 14/071,613, filed Nov. 4, 2013 Non-Final Office Action dated May 18, 2015, 20 pages.
U.S. Appl. No. 14/071,613, filed Nov. 4, 2013 Final Office Action dated Oct. 8, 2015, 11 pages.
U.S. Appl. No. 14/139,299, filed Dec. 23, 2013, Non Final Office Action dated Aug. 14, 2015, 39 pages.
U.S. Appl. No. 14/139,299, filed Dec. 23, 2013, Final Office Action dated Feb. 25, 2016, all pages.
U.S. Appl. No. 14/139,420, filed Dec. 23, 2013 Non-Final Office Action dated Apr. 30, 2015, 27 pages.
U.S. Appl. No. 14/470,392, filed Aug. 27, 2014 Non Final Office Action dated Nov. 5, 2015, 31 pages.
U.S. Appl. No. 14/470,415, filed Aug. 27, 2014 Non Final Office Action dated Nov. 18, 2015, 28 pages.
International Preliminary Report on Patentability for PCT/GB2015/052570 dated Mar. 7, 2017, all pages.
U.S. Appl. No. 14/470,248, filed Aug. 27, 2014, Notice of Allowance dated Aug. 8, 2017, all pages.
U.S. Appl. No. 13/942,451, filed Jul. 15, 2013 Notice of Allowance dated Aug. 7, 2017, all pages.
U.S. Appl. No. 13/919,702, filed Jun. 17, 2013 Notice of Allowance dated Aug. 10, 2017, all pages.
U.S. Appl. No. 13/834,916, filed Mar. 15, 2013 Non-Final Rejection dated Jun. 29, 2017, all pages.
U.S. Appl. No. 14/297,279, filed Jun. 5, 2014 Notice of Allowance dated May 19, 2017, all pages.
U.S. Appl. No. 14/470,248, filed Aug. 27, 2014, Non-Final Office Action dated Apr. 20, 2017, all pages.
U.S. Appl. No. 14/479,007, filed Sep. 5, 2014, Non-Final Office Action dated Jun. 1, 2017, all pages.
U.S. Appl. No. 13/942,451, filed Jul. 15, 2013 Final Rejection dated Apr. 19, 2017, all pages.
U.S. Appl. No. 13/919,702, filed Jun. 17, 2013 Non Final Office Action dated Apr. 28, 2017, all pages.
U.S. Appl. No. 15/389,859, filed Dec. 23, 2016 Non Final Office Action dated May 25, 2017, all pages.
U.S. Appl. No. 15/182,404, filed Jun. 14, 2016, Non-Final Rejection dated Jul. 20, 2017, all pages.
U.S. Appl. No. 13/834,916, filed Mar. 15, 2013 Final Rejection dated Dec. 29, 2017, all pages.
U.S. Appl. No. 15/182,404, filed Jun. 14, 2016, Final Rejection dated Jan. 9, 2018, all pages.
U.S. Appl. No. 15/806,918, filed Nov. 8, 2017, Non-Final Rejection dated Apr. 6, 2018, all pages.
U.S. Appl. No. 14/139,299, filed Dec. 23, 2013, Notice of Allowance dated Aug. 16, 2017, all pages.
U.S. Appl. No. 15/389,859, filed Dec. 23, 2016 Final Rejection dated Sep. 22, 2017, all pages.

* cited by examiner

INTER-RESIDENCE COMPUTING RESOURCE SHARING

CROSS-REFERENCE TO RELATED APPLICATIONS

This application claims the benefit of and priority to U.S. Provisional Application 62/098,896, filed Dec. 31, 2014, which is hereby incorporated by reference in its entirety.

BACKGROUND

The present disclosure relates to satellite television systems. A typical satellite television arrangement comprises a service provider transmitting content via antenna over a unidirectional satellite communication path to a satellite dish and satellite television receiver on or near a customer's home. If a second customer living next door desires to receive content from the same content provider, typically a second satellite dish and television receiver are installed on or near the second customer's home.

BRIEF SUMMARY OF THE INVENTION

Provided are systems and methods for sharing resources of a satellite television receiver between multiple customers. Providing multiple television receivers for multiple satellite television customers may be inefficient in many circumstances, thus there are advantages for systems and/or methods for sharing resources of a single television receiver amongst multiple customers. Such systems and methods are provided in the present disclosure. In one aspect, the present disclosure includes establishing a first network connection between a server system and a computing device associated with a first television customer. Using the first network connection, a request to engage the first television customer in an agreement to share television receiver resources with a different television customer may be received. A server system may then identify a second television customer to engage in a sharing agreement with the first television customer to share the resources of the second television customer's satellite television receiver. The server system may then establish a second network connection between the server system and the second television customer's television receiver. A third network connection between the second customer's television receiver and the first customer's computing device may then be established. Using the second network connection, instructions to configure the television receiver to serve content to the first television customer over the third network connection may be sent. The instructions may include an allocation of resources of the television receiver for use by the first television customer. Finally, content may be sent to the computing device using the third network connection.

In another aspect of the present disclosure, the second television customer may be selected to engage in the agreement with the first television customer to share the resources of the second television customer's television receiver based on particular criterion that specifies a maximum allowable distance between a first residence associated with the first television customer and a second residence associated with the second television customer. In another aspect, the third network connection may be a wireless network communication connection or it may be a hardwired network communication connection.

In yet another aspect of the present disclosure, the allocation of resources of the television receiver may include partitioning tuner resources so that the first television customer is allocated a first set of tuners of the television receiver and the second television customer is allocated a second set of tuners of the television receiver different than the first set of tuners. The allocation of resources of the television receiver may also include partitioning disk drive resources so that the first television customer is allocated a first portion of disk drive storage of the television receiver and the second television customer is allocated a second portion of disk drive storage of the television receiver different than the first portion.

Optionally, resources of the television receiver may be allocated on a first come, first served basis, such that either the first television customer or the second television customer may use any and/or all of the receivers, transcoding capacity, etc. if the other television customer is not using it. Optionally, each television customer is assigned a first allocation of a portion of the resources of the television receiver and permitted to use a second allocation of the resources of the television receiver that are not included in the first allocation if the additional resources are not being used. In this way, both television customers may access the full resources of the television receiver if the other television customer is not using their portion of the resources, but may still be given access to the allocation portion should they desire to make use of the allocation portion. Upon receiving a request for use of resources in excess of an assigned allocation, the television receiver may determine whether additional resources remain unused. Upon determination that there is an available portion of the resources that are not allocated to the requesting subscriber, the television receiver may allocate and/or utilize the available portion of the resources for use by the requesting subscriber. Optionally, the allocated and/or utilized available portion may be later re-allocated for use by the other subscriber upon request.

In one aspect of the present disclosure, a message that confirms successful configuration of the television receiver to serve content to the first television customer over the third network connection may be received using the second network connection. Additionally, the allocation of resources may include partitioning the resources of the television receiver so that the second television customer is unable to identify content served to the first television customer. In another aspect of the present disclosure, systems and methods are provided for separately monitoring access to television programming associated with the first and second television customer so that an invoice for services rendered levied against a first television customer account is separate from an invoice for services rendered levied against a second television customer account.

In yet another aspect of the present disclosure, a satellite television receiver is provided. The television receiver may include a receiver interface configured to receive media content from a content provider, an output interface configured to output media content to a display device, a network interface configured to establish network connections with remote devices and to transmit and receive data over the network connections, and one or more processors. The television receiver may establish a first network connection with a server system using the network interface and receive, using the first network connection, instructions to allocate resources for use by a remote television customer and to serve content to the remote television customer. The television receiver may also allocate resources for use by the remote television customer. Furthermore, the television receiver may establish a second network connection with a computing device associated with the remote television customer using the network interface. The television receiver may be configured to serve content to the remote television customer over the second network connection. The television receiver may serve content to the computing device using the second network connection.

In one aspect of the present disclosure, the television receiver may also include a plurality of tuners. The allocating of television receiver resources may include partitioning of tuner resources so that a first television customer is allocated a first set of the plurality of tuners and a remote television customer is allocated a second set of the plurality of tuners different than the first set of tuners.

In another aspect of the present disclosure, the television receiver may include storage resources. The allocating of television receiver resources may include partitioning the storage resources so that a first television customer is allocated a first portion of the storage resources and the second television customer is allocated a second portion of the storage resources different from the first portion. The television receiver may also send, using the first network connection, a message that confirms successful configuration of the television receiver to serve content to the second television customer.

In yet another aspect of the present disclosure, the instructions that are received by the television receiver may be associated with the server system receiving a request to engage the remote television customer in an agreement to share resources of a television receiver associated with a different customer. The instructions may also be associated with the server system identifying a customer associated with the television receiver to engage in the agreement to share resources of the television receiver.

DETAILED DESCRIPTION OF THE INVENTION

Figure 1:
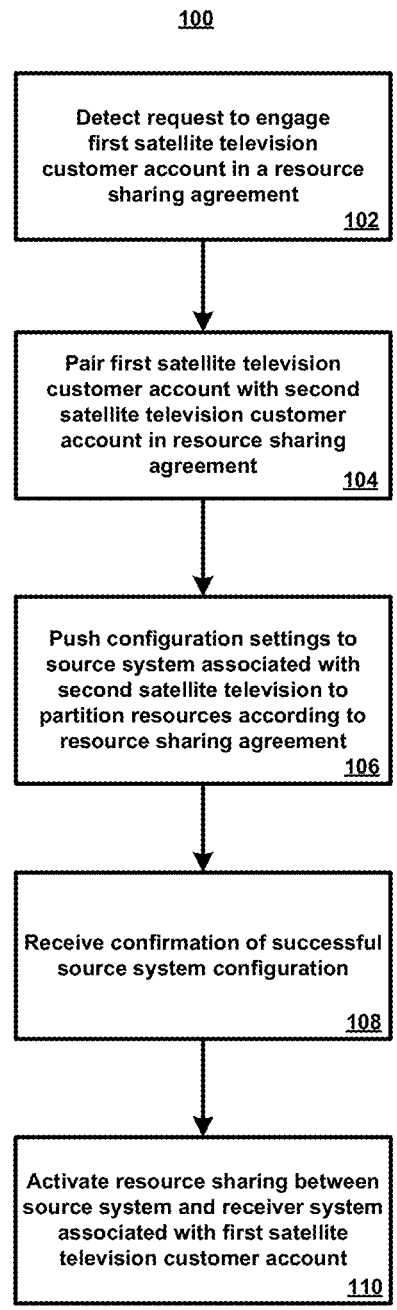
FIG. 1 shows a first example method according to the disclosure.

The present disclosure is generally directed to or towards systems and methods for enabling computing device or system resource sharing. This is achieved at least in part by partitioning resources of a particular computing system such that a first party and at least a second party have access to the various features or functionality in a manner similar to that as if each respective party has a standalone instance of the same. It is contemplated that applicability is far and wide-reaching. Specifically, the various features or aspects of the present disclosure may be applicable to virtually any consumer electronics scenario in which an end-user might not be inclined or even interested in purchasing a particular computing device or system outright.

For example, it is contemplated that the features or aspects of the present disclosure may be applicable to the satellite television industry. In this example, a particular satellite television provider may offer a WHDVR (Whole Home Digital Video Recorder) system, for instance, that which may exhibit capabilities/resources (e.g., number of tuners, number of transcoders, processing capacity, storage capacity, etc.) that far exceed what might be considered normal television viewing needs of a typical consumer or customer. While such capabilities/resources may be used to further enhance the viewing experience of a single household, for example, instances and use cases for a normal or typical household utilizing the totality of such capabilities/resources might be considered rare. It is contemplated that the availability of excess capabilities/resources may be used by a service provider to offer a customer the option to share their WHDVR system with a neighbor, for example, resulting in lower SAC (Subscriber Acquisition Cost) to the service provider and lower cost to each neighbor sharing the service(s), resulting in a higher net profit to or for the service provider.

Although not limited to the example implementation as discussed throughout, the features or aspects of the present disclosure may enable at least two neighboring households to share a WHDVR system, instead of each neighbor having their own WHDVR system. This may reduce the minimum number of content servers from two (2) to one (1), and the number of dish installations from two (2) to one (1), saving cost and installation time and reducing hardware necessary for providing television service to less than that required for two (2) individual systems. It is contemplated that the residence or house without a server/dish system may receive media content from the neighbor by either running a physical cable between houses, and/or or providing a point-to-point wireless link. In some examples, the house without the server may be outfitted with video clients that receive programming across the inter-house link from the neighbor's server. The wireless point-to-point link and use of wireless clients may further enable a complete self-installation by a neighbor, further reducing the installation cost of the sharing scenario as an add-on to an existing system.

Still further, it is contemplated that the server system (e.g., WHDVR, television receiver, set-top-box) itself may partition the same so as to appear as an independent system unique to each household, including drive partitioning for recordings, tuner partitioning, transcoder partitioning, and so on and so forth. Still further, services such as FVOD (Free Video on Demand) and PTAT (Prime Time Anytime) may maintain a single copy instance shared by both households, to maximize disk-space, offering more recording space for each neighbor. From a business perspective, both neighbors may enter an agreement for a full single subscription amount, but discounted based on their sharing of equipment and reduced capabilities. Advantageously, such an implementation may serve to enhance profits for the service providers, and may serve to entice new customers to subscribe to services as offered by a particular satellite television provider, as well as provide an incentive for existing customers to maintain their loyalty and/or relationship with the satellite television provider. Although not so limited, an appreciation of the various aspects of the present disclosure may be gained from the following discussion in connection with the drawings. For instance, referring now to FIG. 1, a first example method 100 is shown in accordance with the present disclosure.

At step 102, a service provider server computing device or system may receive a request that originates from a computing device associated with a first satellite television customer account, to engage in a television receiver resource sharing agreement with another satellite television customer account. In this example, the computing device associated with the first satellite television customer account may include or comprise of a handheld mobile device or a desktop computer for instance. Additionally, an individual associated with the first satellite television customer account may not have or own a television receiver and/or satellite dish, that which might normally be installed to a residence associated with the individual in order to enable the individual to access satellite television programming and content. Rather, once engaged in a television receiver resource sharing agreement with another satellite television customer account, the individual may access satellite television programming and content in accordance with the principles of the present disclosure. An example of an architecture in which aspects of the present disclosure may be implemented is shown and discussed below in connection with FIG. 2.

At step 104, the service provider server computing device or system may locate or identify and pair the first satellite television customer account with a second satellite television customer account, to engage the two parties in a television receiver resource sharing agreement. In this example, the service provider server computing device or system may query a database or table or the like of existing satellite television customer accounts to identify the second satellite television customer account, that which might be selected upon particular criteria or criterion. For example, the second satellite television customer account might be selected based upon a particular distance criterion. For example, the second satellite television customer account might be selected if a residence associated with the second satellite television customer account is within a "quarter-mile radius" distance from the residence associated with the first satellite television customer account. An example of pairing satellite television customer accounts based upon vicinity criteria or criterion is shown and discussed below in connection with FIG. 4. Other examples are however possible, and may or may not be implementation-specific.

At step 106, the service provider server computing device or system may transmit configuration settings or the like to a television receiver, set-top-box, or the like associated with the second satellite television customer account, to enable the same to configure itself in software to partition resources according to the resource sharing agreement. For example, the resource sharing agreement may specify that the first satellite television customer account upon engaging in the agreement has rights to three (3) tuners/decoders, 50% of usable hard disk capacity, etc. Many other examples are possible as well, and it will be appreciated that the resource sharing agreement may be defined or customized or otherwise established as needed or desired. For example, transcoder capacity may be a resource that is shared between customers, which may be beneficial for allowing content to be moved to other device both in an outside the customer's home, such as to a smartphone, tablet, etc. Furthermore, other consideration such as communication link bandwidth, distance between systems, etc., may play a role in how the resource sharing agreement is defined or customized. It will be appreciated that additional equipment may be needed for establishing a network link between customers' networks, such as a wireless bridge, wired network connection, etc., in order to allow efficient resource sharing. For example, a wireless bridge may include a first wireless transceiver connected to a first customer's network and a second wireless transceiver connected to a second customer's network. Wireless bridges may be established using a variety of microwave-based wireless network technology, including, but not limited to, Institute of Electrical and Electronics Engineers (IEEE) 802.11 compliant network devices.

At step 108, the service provider server computing device or system may receive from the television receiver, set-top-box, or the like, sometimes referred to as "source," associated with the second satellite television customer account a confirmation message or the like, that which indicates that the source associated with the second satellite television customer has successfully configured itself to partition resources according to the resource sharing agreement. In this example, it is contemplated that the confirmation message may include various information, diagnostic or otherwise. For example, as part of the configuration process the source associated with the second satellite television customer may test a communication connection established between the source and a television or the like, sometimes referred to as "receiver," associated with the first satellite television customer, and report quality of the communication connection, etc. Advantageously, such information may be used to enhance or maximize QoE (Quality of Experience) of the individual associated with the first satellite television customer account.

At step 110, the service provider server computing device or system may activate or enable resource sharing between the source and receiver so that the individual associated with the first satellite television customer may access satellite television programming and content in accordance with the principles of the present disclosure. For example, it is contemplated that the individual may then use a remote control to access an EPG (Electronic Programming Guide) and then any particular content selected from myriad of television channels, on-demand content, etc., the same of which is served to a television from the source.

Such an implementation as discussed in connection with FIG. 1 may be beneficial and/or advantageous in many respects. For example, the features or aspects as discussed in the context of FIG. 1 may, among other things, serve to provide potential satellite television customers without access to a satellite dish, a television receiver, or an adequate location for placing such devices the option of finding a nearby customer who can provide them. For example, in some scenarios, a current satellite television customer may be living on the top floor of a building with an adequate location to place a satellite dish while a prospective customer may be living on the bottom floor of the same building, without a suitable location for a satellite dish. It may be a mutually beneficial arrangement for the current customer to share resources of his satellite dish and television receiver with the prospective customer in exchange for some fee. In some scenarios, the current customer may only be using a percentage of the total capacity of the television receiver resources, and thus sharing some percentage of the resources may have no effect on his satellite television experience. For some configurations, higher end equipment, such as more tuners, better computational performance, transcoders, etc., may be provided to or customers engaged a service sharing configuration as described herein; such hardware may not be otherwise available to the customers or may be only available to the customers with an increase in service fees, allowing both customers to take advantage of the additional features in the resource sharing configurations described herein. In addition, lower carbon footprints of customers and service providers may be achieved using the systems and techniques disclosed herein. For example, electrical energy savings may be achieved by reduction of the number and/or complexity of devices and/or reduced energy usage. In some implementations, at least a portion of the hardware devices are simplified and/or reduced in number and may use less energy as compared to the configuration where both television customers have a full suite of receiver devices (television receiver, satellite dish, etc.) for accessing television content, which may be attractive to some subscribers and potential subscribers. Further, fewer and/or less complex hardware may also result in less equipment that may have to be disposed of and/or recycled at the end of its useful life. Depending on the implementation, each customer may be given a cost savings in their service by the television provider as compared to a configuration where resource sharing is not utilized. Fee reductions may be brokered by the service provider. In some embodiments, fee shifting may be negotiated between customers, though, for some situations, this may be in violation of a provider service agreement. Advantageously, the television provider may obtain a competitive advantage from an increase in profits due to the reduction in operational and subscriber acquisition costs that may be associated with a reduction in equipment in the resource sharing configurations described herein.

The following examples may run counter to that described in FIG. 1. In the example described with reference to FIG. 1, the initiating customer may not have access to a satellite dish and an associated receiver and/or may require such service by way of a neighbor's satellite receiver system in order to receive any satellite subscription at all. Instead, sharing of service may be initiated, at least in part, by the customer that has access to a satellite dish and an associated receiver, such as a customer that may wish to share service with a neighbor, such as a downstairs neighbor in an apartment complex that cannot install a satellite dish on their premises. In the following examples, aspects of FIG. 1 may be implemented, though not necessarily in the order of operations described in the preceding paragraphs in order to establish an agreement and service sharing configuration between two satellite television customers.

As an alternative to the method described with reference to FIG. 1, a second satellite television customer may generate a request to share the resources of its satellite television system in a resource sharing agreement, and this request may be received by a provider. The second satellite television customer may, alternatively or additionally, invite other customers to share the resources of its satellite television system. Upon establishment of such an agreement, both customers may receive a reduction in subscription fees, and such a reduction may entice an existing customer to reach out to neighbors who do not yet have television service. The provider may facilitate passing the invitation to other customers, who may be specified directly by the second satellite television customer, such as a friend or neighbor of the second satellite television customer. Other incentives provided by the provider to customers joining in a resource sharing agreement may include access to advanced hardware (e.g., larger number of tuners, greater storage space, better processing power) as compared to hardware provided to customers that do not join in a resource sharing agreement.

Alternatively or additionally, the provider may maintain lists or pools of customers that are interested in receiving television service through a sharing agreement, such as for a reduction in subscriber fees, and may match up or pair potential second satellite television customers with potential first satellite television customers. For example, the potential second satellite television customers may be those customers that possess or may wish to install a satellite dish at their premises and may wish to engage in a sharing agreement with a first satellite television customer. The potential first satellite television customers may be those customers that do not possess or may not wish to install or cannot install a satellite dish at their premises and so may wish to engage in a sharing agreement with a second satellite television customer in order to obtain satellite television services. Optionally, matching may be performed at the exclusive discretion of the provider. Optionally, matching may incorporate input from potential first satellite television customers and/or potential second satellite television customers regarding which other parties they may be willing to be matched with. In embodiments, joining of existing customers to a matching pool may take place by "opt-in" or "opt-out" mechanisms.

In other scenarios, certain prospective satellite television customers may have available to them a hardwired communication link to a current satellite television customer, e.g., a fiber-optic communication connection. Resource sharing agreements may be particularly feasible in such scenarios because the major limitation in most resource sharing arrangements is likely to be the communication link between the residences of the prospective and current customers. In other scenarios, two current satellite television customers may each already have their own satellite dishes and television receivers, but may decide to share resources of a single satellite dish and television receiver for various reasons, e.g., save money, improve exterior appearance of residence, etc. Further scenarios and/or beneficial aspects associated with enabling computing device or system resource sharing are described in detail below in connection with FIGS. 2-6.

Figure 2:
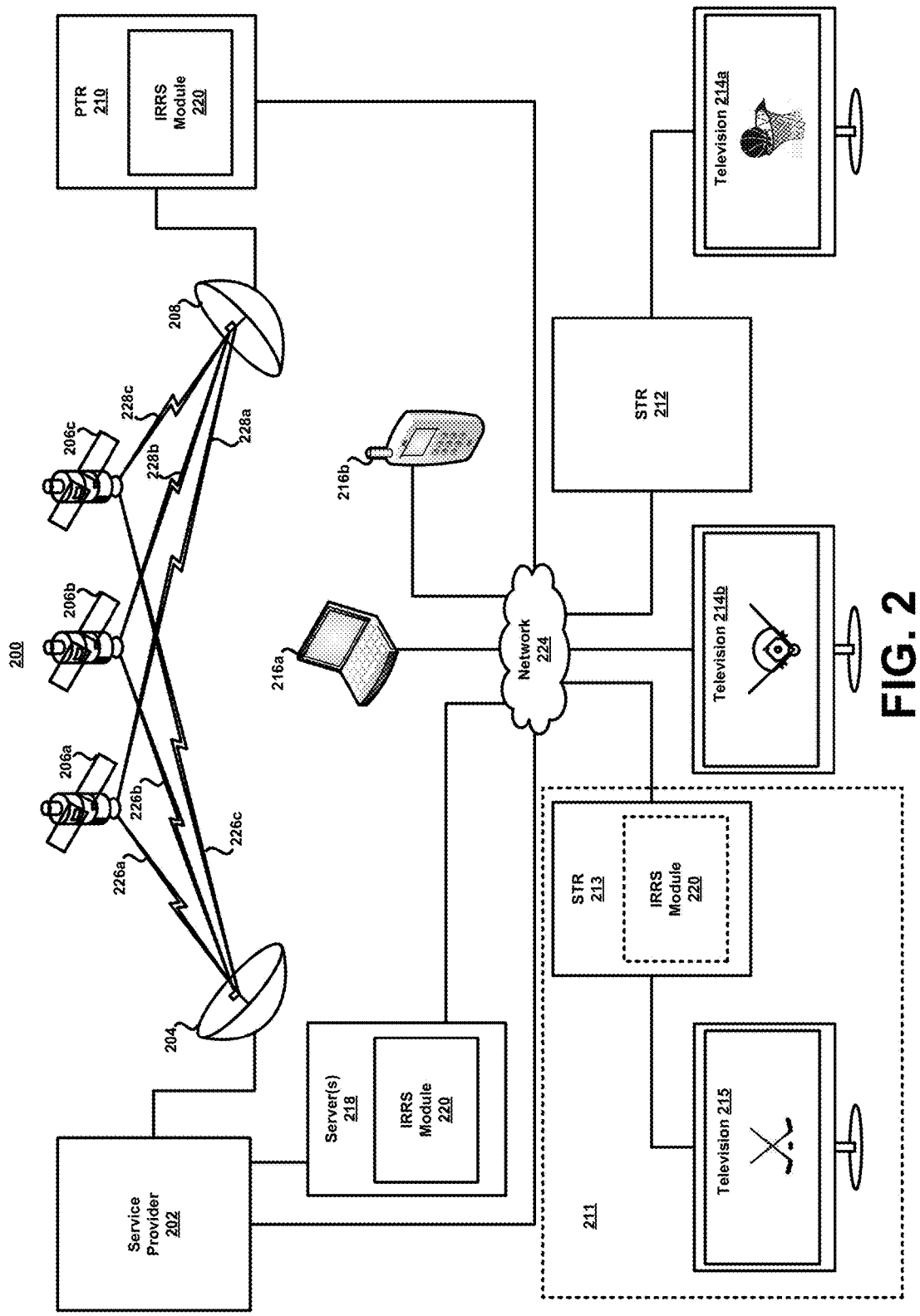
FIG. 2 shows an example satellite system according to the disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media content distribution system as desired.

The example system 200 may include a service provider 202, a satellite uplink 204, a plurality of satellites 206a-c, a satellite dish 208, a PTR (Primary Television Receiver) 210, a plurality of STRs (Secondary Television Receivers) 212 and 213, a plurality of televisions 214a-b and 215, a plurality of computing devices 216a-b, and at least one server 218 that may be associated with the service provider 202. Additionally, the PTR 210, computing devices 216a-b, STR 213 and/or server 218 may include or otherwise exhibit an IRRS (Inter-Residence Resource Sharing) module 220. In general, the IRRS module 220 may be configured and/or arranged to implement various features or aspects of the present disclosure associated with enabling computing device or system resource sharing. In one embodiment, PTR 210, computing devices 216a-b, STR 212 and televisions 214a-b are present in a first subscriber's residence, while STR 213 and television 215 are present in a second subscriber's residence 211.

The system 200 may further include at least one network 224 that establishes a bidirectional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212 and 213, as described throughout may generally be any type of television receiver, television converter, etc., such as a STB for example. In another example, the PTR 210, and the STRs 212 and 213, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212 and 213 and televisions 214a-b and 215, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, process, and relay particular transponder streams to the television 214*b* for display thereon. For example, the satellite dish 208 and the PTR 210 may, respectively, be configured to receive, decode, process, and relay at least one premium HD-formatted television channel to the television 214*b*. Programming or content associated with the HD channel may generally be presented live, or from a recording as previously stored on, by, or at the PTR 210. Here, the HD channel may be output to the television 214*b* in accordance with the HDMI/HDCP content protection technologies. Other examples are however possible. It will be appreciated that various processing may be required in order to relay particular transponder streams and/or channels for use by a television 214*b* and/or a television receiver associated therewith, such as decryption, IP encapsulation, display format conversion, etc.

Further, the PTR 210 may select via tuner, decode, and relay particular transponder streams to one or both of the STRs 212 and 213, which may in turn relay particular transponder streams to a corresponding one of the televisions 214*a-b* and 215 for display thereon. For example, the satellite dish 208 and the PTR 210 may, respectively, be configured to receive, decode, and relay at least one television channel to the television 214*a* by way of the STR 212. Similar to the above-example, the television channel may generally be presented live, or from a recording as previously stored on the PTR 210, and may be output to the television 214*a* by way of the STR 212 in accordance with a particular content protection technology and/or networking standard. Still further, the satellite dish 208 and the PTR 210 may, respectively, be configured to receive, decode, and relay at least one premium television channel to one or each of the computing devices 216*a-b*. Similar to the above-examples, the television channel may generally be presented live, or from a recording as previously stored on the PTR 210, and may be output to one or both of the computing devices 216*a-b* in accordance with a particular content protection technology and/or networking standard.

Optionally, the IRRS modules 220, when present in two or more of PTR 210, computing devices 216*a-b*, server 218, or STR 213 device present at another residence 211 for which sharing of resources may be implemented, may each operate with independent features and functions and work in tandem to implement or facilitate sharing of resources as described herein. For example, IRRS module 220 present in server 218 may trigger the IRRS module 220 present in PTR 210 to allocate resources for use by remote STR 213 at residence 211. Optionally, the IRRS module 220 present in PTR 210 may partition the user experience and/or unique user settings, the hardware resources (e.g., hard drive recording storage, transcoders, tuners, etc.), maintain security, maintain privacy between the two subscribers (e.g., account information), execute purchase transactions with server 218 or service provider 202, manage resource conflicts (if present) between subscribers, maintain subscription rights for both subscribers, and communize material, such as video on demand and duplicate recordings in order to minimize resource use for duplicative material. Additionally, an IRRS module present in a remote STR 213, may allow the remote STR 213 to request content from PTR 210 be provided to the remote television receiver for display on a remote display device at the other residence. For example, in one embodiment, STRs 213 may represent a remote television receiver at another subscriber's residence 211, in accordance with the present description. Other functions of the IRRS module 220 of the remote STR 213 may allow triggering of recordings at PTR 210, requesting on-demand programming from service provider 202 by way of satellite dish 208, etc., and the IRRS module 220 of PTR 210 may allow tracking of channel usage, channel requests, resource usage, etc., to ensure that the subscriber of residence 211 is operating within allocated parameters and to appropriately charge each subscriber for the services rendered/used. Furthermore, although STR 213 is illustrated as connected to PTR 210 by way of network 224, a direct or alternative connection may be established between STR 213 and PTR 210 for communication of operational requests and content, such as a wireless bridge.

Figure 3:
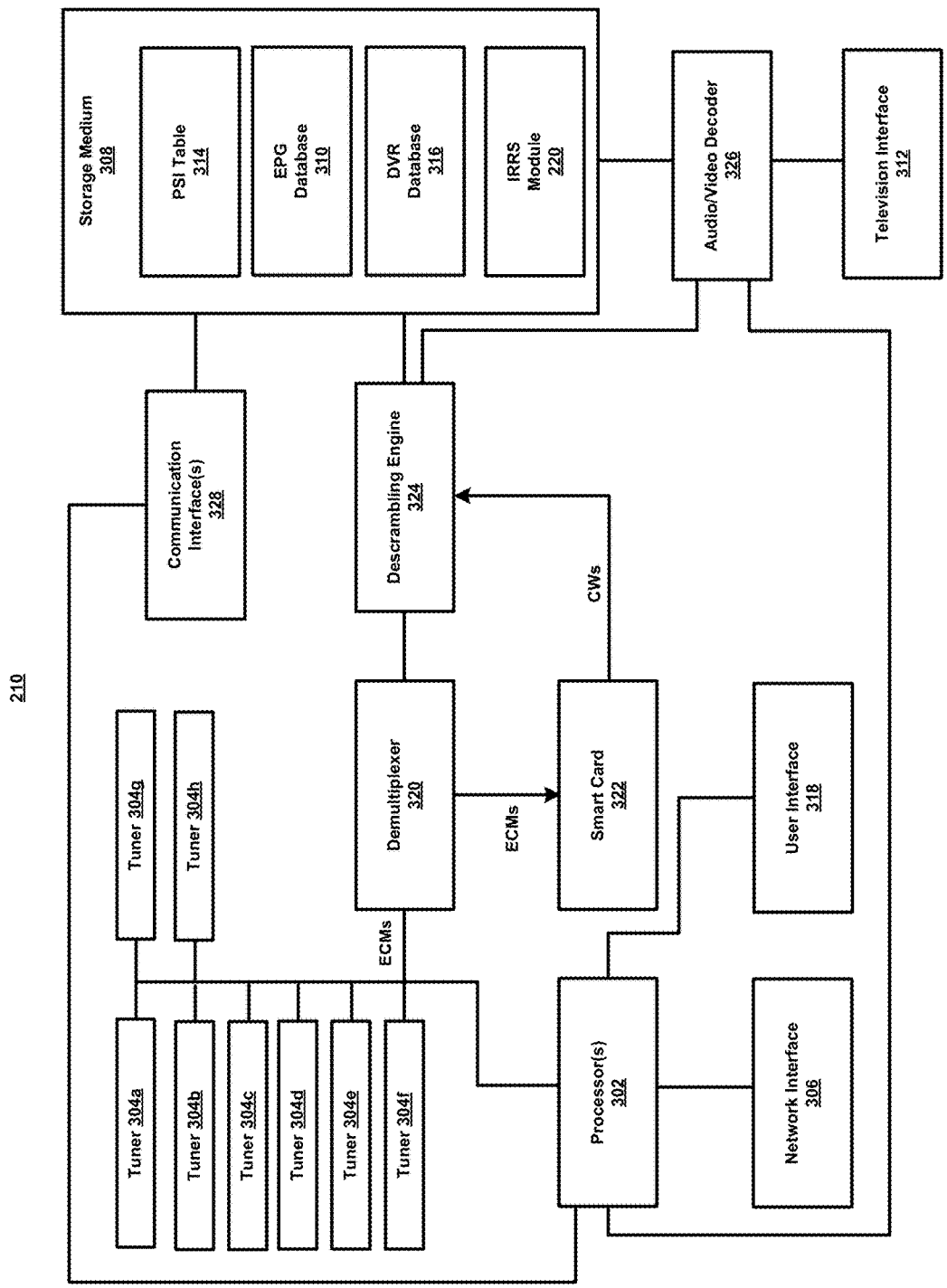
FIG. 3 shows an example block diagram of a television receiver.

Referring now to FIG. 3, an example block diagram of the PTR 210 of FIG. 2 is shown in accordance with the disclosure. In some examples, the STRs 212 and 213 may be configured in a manner similar to that of the PTR 210. In some examples, the STRs 212 and 213 may be configured and arranged to exhibit a reduced functionality as compared to the PTR 210, and may depend at least to a certain degree on the PTR 210 to implement certain features or functionality. The STRs 212 and 213 in this example may be each referred to as a "thin client."

The PTR 210 may include one or more processors 302, a plurality of tuners 304*a-h*, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304*a-h* may be used to tune to television channels, such as television channels transmitted via satellites 306*a-c*. Each one of the tuners 304*a-h* may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. If multiple television channels transmitted on the same transponder stream are desired, a particular tuner (e.g., tuner 304*c*) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206a-c, which may be unidirectional to the PTR 210, and an another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the IRRS module 220 mentioned above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In this example, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be updated periodically or, at least, intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
| --- | --- | --- | --- | --- | --- |
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. Additional control schema are contemplated, including voice-based control, gesture-based control, smart-phone-based control, web-based control, keyboard-based control, mouse-based control, etc. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying or otherwise compensating the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PD. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features for enabling computing device or system resource sharing. For example, the PTR 210 is shown in FIG. 3 to include the IRRS module 220 as mentioned above in connection with FIG. 2. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Optionally, each television subscriber that engages in a resource sharing configuration as described herein may independently subscribe to individual programming packages unrelated to another subscriber that resources are shared with. As an example, one subscriber may subscribe to a "top 120" package that includes 120 video and/or music channels, while the other subscriber may subscribe to a "top 200" package that includes 200 video and/or music channels. It will be appreciated that the permissions needed for access and or decryption of the various programming packages subscribed to by the different customers may be controlled by the television receiver at one of the subscriber's residences. For example, smart card 322 may generate different control words or entitlement management messages per each subscriber account to ensure that subscription rights are managed appropriately per customer account. Authorizations for decryption or descrambling of received content streams may be communicated in various ways to the system including smart card 322, such as over satellite or over a packet-based network connection, such as an Internet connection, amongst others.

Optionally, each television subscriber that engages in a resource sharing configuration as described herein may independently select various options unrelated to those of another subscriber that resources are shared with. As an example, favorites lists, parental control settings, electronic program guide screen appearance settings, system control operation (e.g., remote control(s), gesture control(s)), etc. may be managed by each subscriber independently, even though resources of a television receiver are shared between the subscribers.

Figure 4:
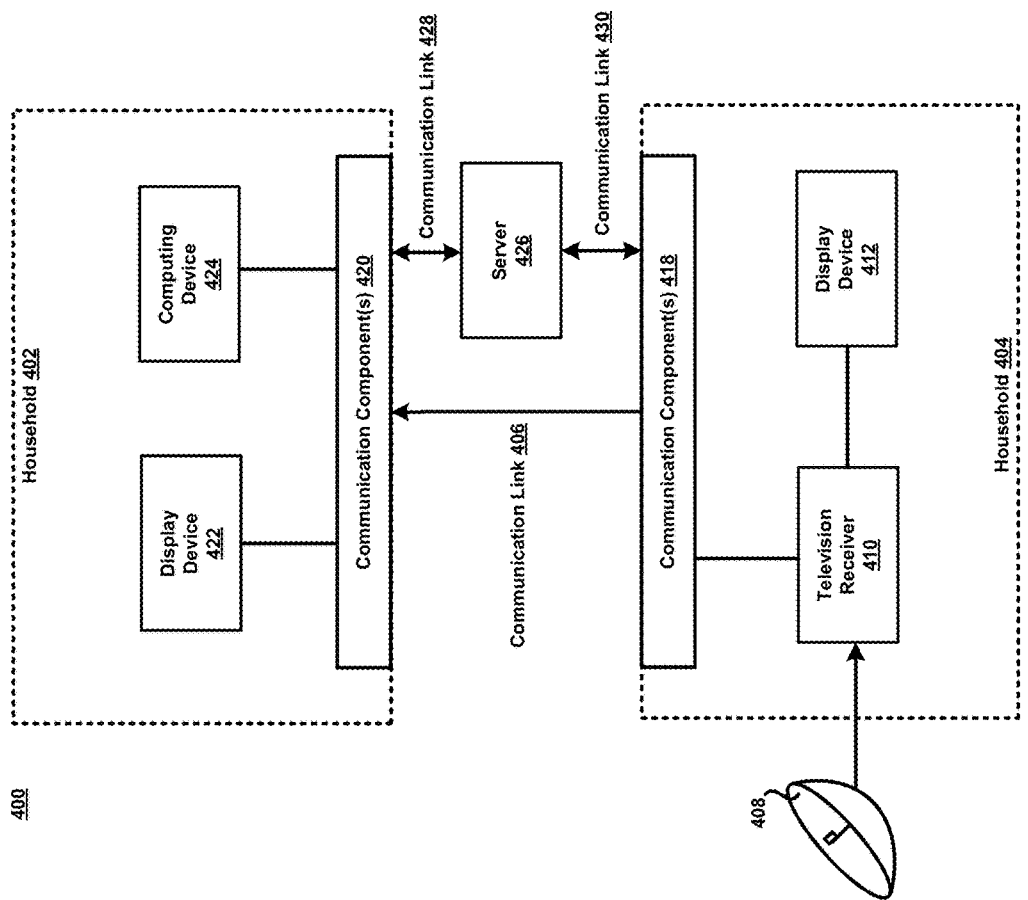
FIG. 4 shows an implementation-specific scenario according to the disclosure.

Referring now to FIG. 4, an example implementation-specific architecture 400 is shown in accordance with the present disclosure. In particular, FIG. 4 shows a simplified plan view of a residential area in which a first household 402 is in "close" proximity to a second household 404, such that the first household 402 and the second household 404 may roughly be considered neighboring households. Other examples are possible, and it is contemplated that the first household 402 and the second household 404 need not necessarily be in relatively close proximity, such as "within a 20 meter radius" for instance. Close proximity may be preferred in instances in which a communication link 406 established between the first household 402 and the second household 404 is a wireless communication link. In examples in which the communication link 406 is a hard-wired communication link, it may generally be immaterial as to how close the first household 402 is to the second household 404. For example, the first household 402 may be "within a 1 mile radius" or "within a 100 mile radius" or "within a 1000 mile radius" etc. in such an implementation.

Optionally, communication link 406 is or includes a wireless bridge. In some circumstances, use of a wireless bridge for communication link 406 may require that first household 402 and/or second household 404 purchase or otherwise be provided with specialized hardware for establishment of the wireless bridge. In one embodiment, television receiver 410 may relay video signals over communication link 406, exemplified as including a wireless bridge, to household 402, at which computing device 424, communication components 420, and/or display device 422 includes a thin client, such as described above with reference to STRs 212 and 213, for displaying content at one or more audio/video presentation systems, such as display device 422, a television, stereo, tablet display, etc.

In the present example, it is contemplated that a resource sharing agreement may exist in that satellite television programming, as received via a satellite dish 408 and a television receiver 410 for output by a display device 412 that is associated with the second household 404, may be served to the first household 402 over the communication link 406. In particular, requested satellite television programming may initially be routed by the television receiver 410 to a communication component 418 (e.g., a router, a wireless bridge endpoint device, a wired network connection, etc.) that is associated with the second household 404. The requested satellite television programming may then be sent over the communication link 406 to a communication component 420 (e.g., a router, a wireless bridge endpoint device, a wired network connection, etc.) that is associated with the first household 402. The requested satellite television programming may then be routed by the communication component 420 to a display device 422 that is associated with the first household 402 for output thereby. In this manner, an individual associated with the first household 402 may access satellite television programming and content in accordance with the principles of the present disclosure.

Additionally, it is contemplated that the individual associated with the first household 402 may utilize a computing device 424 (e.g., a personal computer) to enter into the above-mentioned resource sharing agreement. In particular, the individual associated with the first household 402 may utilize the computing device 424 to generate a request to engage in a television receiver resource sharing agreement, that which may be sent to a server system 426 over a communication link 428 as shown in FIG. 4. Here, the server system 426 may identify and pair a satellite television customer account associated with the first household 402 with a satellite television customer account associated with the second household 404, in order to engage the two parties in a television receiver resource sharing agreement. For example, the server system 426 may query a database or table or the like of existing satellite television customer accounts to identify the satellite television customer account associated with the second household 404, that which might be selected upon particular criteria or criterion.

For example, the satellite television customer account associated with the second household 404 might be selected based upon a particular distance criterion. For example, the same might be selected if the second household 404 is "within a 30 meter radius," or "within a 1 mile radius" if the "within a 30 meter radius" criterion is not met by any particular satellite television customer account in the database, and so on. In this example, the server system 426 may identify or otherwise select the second household 404 and then transmit configuration settings to the television receiver 410 that is associated with the second household 404 over a communication link 430 and via the communication component 418. Here, the television receiver 410 may then configure itself, in software or firmware for example, to partition resources according to the resource sharing agreement. For example, the resource sharing agreement may specify that the satellite television customer account associated with the first household 402 upon engaging in the agreement has rights to two (2) tuners/decoders, 40% of usable hard disk capacity, etc. Once this process is complete, the television receiver 410 may send a message to the server system 426 over the communication link 430 to confirm that the television receiver 410 has successfully configured itself to partition resources according to the resource sharing agreement.

In some examples, the message may include additional information such as quality and/or bandwidth of the communication link 406. Other examples are possible. Upon receipt of the message, however, the server system 426 may activate or enable resource sharing between the first household 402 and the second household 404 so that the individual associated with the first household 402 may access satellite television programming and content in accordance with the principles of the present disclosure, in manner substantially similar as to how an individual associated with the second household 404 would access satellite television programming and content via interaction with the display device 412 and/or television receiver 410.

Supplemental content may be received by either or both household 402 or household 404, such as from server 426 or another server associated with the content service provider, such as over a wired cable connection or a wired or wireless network connection, such as an Internet connection. Such supplemental content may be received, for example, over a communication link other than that by which television receiver 410 receives content, such as a communication link other than from satellite 408. In embodiments, communication links 428 and 430 may provide supplemental content. In one embodiment, household 402 may receive content from the provider that may be supplemental to that received from television receiver 410 by way of satellite 408, such as over communication link 428. In this way, additional content may be delivered to household 402, such as over an IP link, without burdening television receiver 410, communication link 406 or communication link 430.

Figure 5:
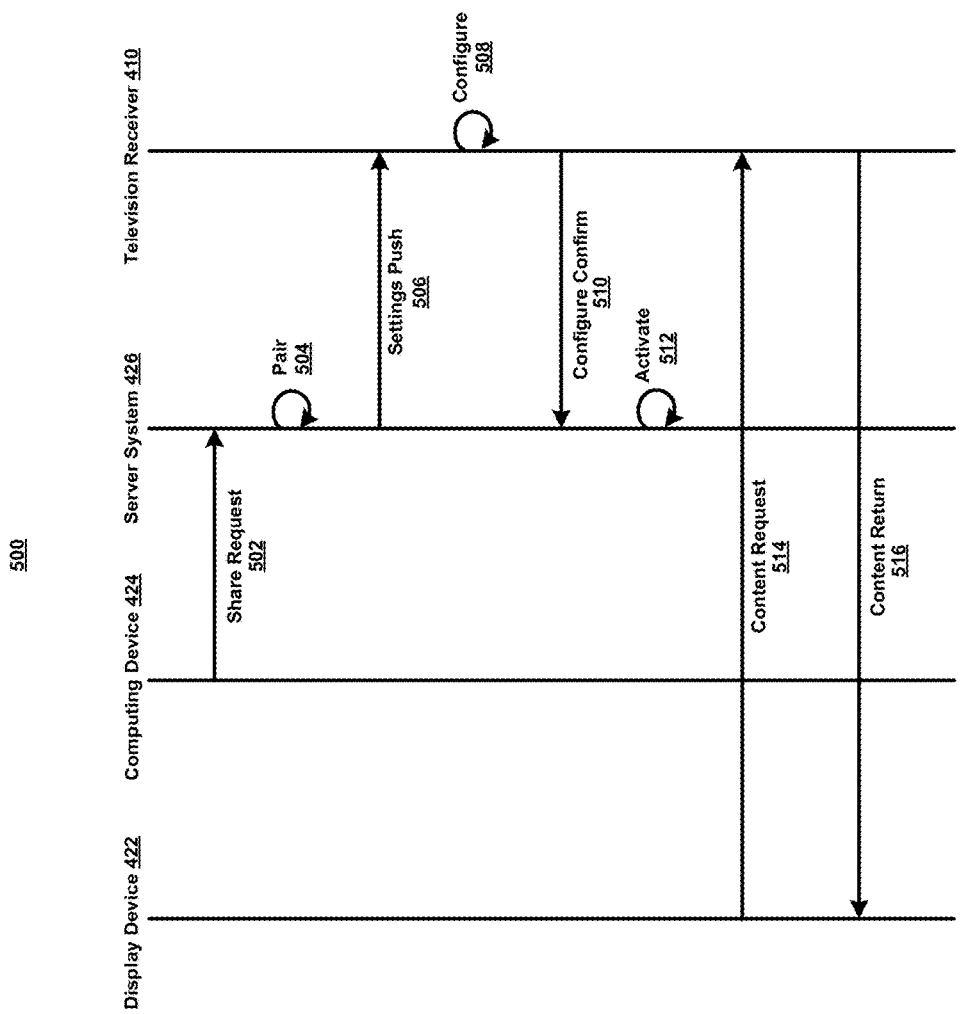
FIG. 5 shows an example communication sequence according to the disclosure.

Referring now to FIG. 5, an example communication sequence 500 is shown in accordance with the present disclosure. In particular, and with additional reference to the various elements or components of FIG. 4 throughout, it is contemplated that the individual associated with the first household 402 may utilize the computing device 424 to generate 502 a request to engage in a television receiver resource sharing agreement, that which may be sent to the server system 426. The server system 426 may then identify and pair 504 a satellite television customer account that is associated with the first household 402 with a satellite television customer account that is associated with the second household 404, to engage the two parties in a television receiver resource sharing agreement.

The server system 426 may then identify or otherwise select the second household 404 and then transmit 506 configuration settings or the like to the television receiver 410 that is associated with the second household 404. The television receiver 410 may then configure 508 itself to partition resources according to the resource sharing agreement. Once this process is complete, the television receiver 410 may send 510 a message to the server system 426 to confirm that the television receiver 410 has successfully configured itself to partition resources according to the resource sharing agreement.

Upon receipt of the message, the server system 426 may then activate or enable 512 resource sharing between the first household 402 and the second household 404. Accordingly, an individual associated with the first household 402 may then interact 514 with the display device 422 to access satellite television programming and other content, that is served 516 to the display device 422 by the television receiver 410, in a manner substantially similar as to how an individual associated with the second household 404 would access satellite television programming and content via interaction with the display device 412 and/or television receiver 410.

Figure 6:
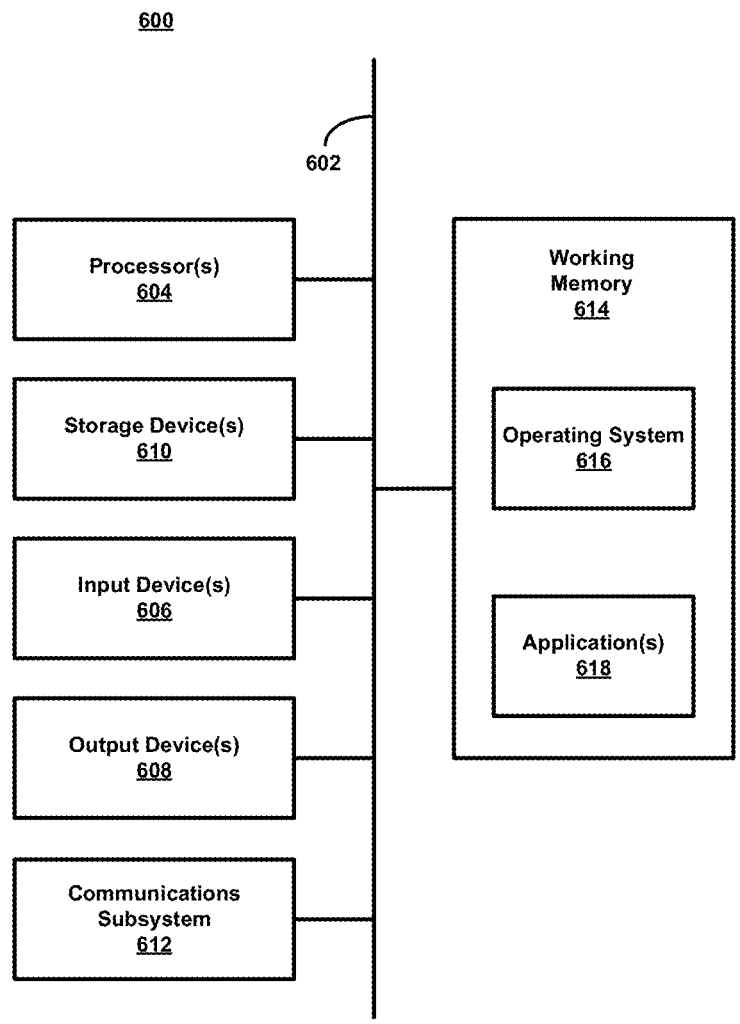
FIG. 6 shows an example computing system or device.

FIG. 6 shows an example computer system or device 600 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 600, such as any of the respective elements of at least FIG. 2. In this manner, any of one or more of the respective elements of at least FIG. 2 may be configured and/or arranged, wholly or at least partially, for enabling computing device or system resource sharing, in manner consistent with that discussed above in connection with FIGS. 1-5. For example, any of one or more of the respective elements of at least FIG. 2 may be configured and/or arranged to perform and/or include instructions that, when executed, perform the method of FIG. 1. Still further, any of one or more of the respective elements of at least FIG. 2 may be configured to perform and/or include instructions that, when executed, instantiate and implement functionality of the PTR 210 and/or the computing devices 216*a-b* and/or the server(s) 218 of FIG. 2.

The computer device 600 is shown comprising hardware elements that may be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which may include without limitation a remote control, a mouse, a keyboard, and/or the like; and one or more output devices 608, which may include without limitation a presentation device (e.g., television), a printer, and/or the like.

The computer system 600 may further include (and/or be in communication with) one or more non-transitory storage devices 610, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 600 might also include a communications subsystem 612, which may include without limitation a modem, a network card (wireless and/or wired), an infrared communication device, a wireless communication device and/or a chipset such as a Bluetooth™ device, 602.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 612 may permit data to be exchanged with a network (such as the network described below, to name one example), other computer systems, and/or any other devices described herein. In many examples, the computer system 600 will further comprise a working memory 614, which may include a random access memory and/or a read-only memory device, as described above.

The computer device 600 also may comprise software elements, shown as being currently located within the working memory 614, including an operating system 616, device drivers, executable libraries, and/or other code, such as one or more application programs 618, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer system 600. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 600) to perform methods in accordance with various examples of the disclosure. According to a set of examples, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 610. Volatile media may include, without limitation, dynamic memory, such as the working memory 614.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), etc., any other memory chip or cartridge, or any other medium from which a computer may read instructions and/or code. Various forms of computer-readable media may be involved in carrying one or more sequences of one or more instructions to the processor(s) 604 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

It should further be understood that the components of computer device 600 can be distributed across a network. For example, some processing may be performed in one location using a first processor while other processing may be performed by another processor remote from the first processor. Other components of computer system 600 may be similarly distributed. As such, computer device 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for sharing resources of a television receiver between two or more customers, the method comprising:
   establishing, at a server system, a first network connection between the server system and a computing device associated with a first television customer account;
   receiving, using the first network connection, a request to engage the first television customer account in an agreement to share television receiver resources associated with a different television customer account;
   identifying, by the server system, a second television customer account to engage in an agreement with the first television customer account to share the television receiver resources of a television receiver located at a residence associated with the second television customer account, the television receiver being a satellite television receiver coupled with a satellite dish to receive satellite television programming, and the television receiver resources comprising television tuner resources of the satellite television receiver;
   establishing, at a server system, a second network connection between the server system and the television receiver;
   facilitating establishment of a direct point-to-point network connection between the television receiver and the computing device;
   sending, using the second network connection, instructions to configure the television receiver to serve content to the first television customer account over the direct point-to-point network connection, wherein the instructions include an allocation of resources of the television receiver for use by the first television customer account, wherein the allocation of resources includes partitioning the tuner resources so that the first television customer account has allocated thereto a first set of one or more tuners of the television receiver and so that the second television customer account has allocated thereto a second set of one or more tuners of the television receiver different than the first set of one or more tuners; and
   facilitating sending content from the television receiver to the computing device using the direct point-to-point network connection.

2. The method of claim 1, further comprising:
   selecting the second television customer account to engage in the agreement with the first television customer account to share resources of the television receiver based upon a particular criterion that specifies a maximum allowable distance between a first residence associated with the first television customer account and a second residence, the second residence being the residence associated with the second television customer account.

3. The method of claim 1, wherein the direct point-to-point network connection includes a wireless communication bridge.

4. The method of claim 1, wherein the allocation of resources of the television receiver includes partitioning tuner resources so that the first television customer account has exclusively allocated thereto the first set of one or more tuners of the television receiver and so that the second television customer account has exclusively allocated thereto the second set of tuners of the television receiver.

5. The method of claim 1, wherein the allocation of resources of the television receiver includes partitioning disk drive resources so that the first television customer account has allocated thereto a first portion of disk drive storage of the television receiver and so that the second television customer account has allocated thereto a second portion of disk drive storage of the television receiver different than the first portion.

6. The method of claim 1, further comprising:
   receiving, using the second network connection, a message that confirms successful configuration of the television receiver to serve content to the first television customer account over the direct point-to-point network connection.

7. The method of claim 1, wherein a residence associated with the first television customer account lacks satellite uplink access for obtaining satellite television programming content, and wherein the residence associated with the second television customer account has satellite uplink access for obtaining satellite television programming content.

8. The method of claim 1, further comprising:
   separately monitoring access to television programming associated with the first television customer account and the second television customer account so that an invoice for services rendered levied against the first television customer account is separate from an invoice for services rendered levied against the second television customer account.

9. A non-transitory processor-readable medium comprising instructions that, when executed by one or more processors, cause the one or more processors to perform operations including:
   establishing, at a server system, a first network connection between the server system and a computing device associated with a first television customer account;
   receiving, using the first network connection, a request to engage the first television customer account in an agreement to share television receiver resources associated with a different television customer account;
   identifying, by the server system, a second television customer account to engage in an agreement with the first television customer account to share the television receiver resources of a television receiver located at a residence associated with the second television customer account, the television receiver being a satellite television receiver coupled with a satellite dish to receive satellite television programming, and the television receiver resources comprising television tuner resources of the satellite television receiver;
   establishing, at a server system, a second network connection between the server system and the television receiver;
   facilitating establishment of a direct point-to-point network connection between the television receiver and the computing device;
   sending, using the second network connection, instructions to configure the television receiver to serve content to the first television customer account over the direct point-to-point network connection, wherein the instructions include an allocation of resources of the television receiver for use by the first television customer account, wherein the allocation of resources includes partitioning the tuner resources so that the first television customer account has allocated thereto a first set of one or more tuners of the television receiver and so that the second television customer account has allocated thereto a second set of one or more tuners of the television receiver different than the first set of one or more tuners; and facilitating sending, using the direct point-to-point network connection, content to the computing device.

10. The non-transitory processor-readable medium of claim 9 further comprising instructions that, when executed by one or more processors, cause the one or more processors to perform operations including:
selecting the second television customer account to engage in the agreement with the first television customer account to share resources of the television receiver based upon a particular criterion that specifies a maximum allowable distance between a residence associated with the first television customer account and the residence associated with the second television customer account.

11. The non-transitory processor-readable medium of claim 9, wherein the allocation of resources of the television receiver includes partitioning tuner resources so that the first television customer account has exclusively allocated thereto the first set of one or more tuners of the television receiver and so that the second television customer account has exclusively allocated thereto the second set of one or more tuners of the television receiver.

12. The non-transitory processor-readable medium of claim 9, wherein the allocation of resources of the television receiver includes partitioning disk drive resources so that the first television customer account has allocated thereto a first portion of disk drive storage of the television receiver and so that the second television customer account has allocated thereto a second portion of disk drive storage of the television receiver different than the first portion.

13. The non-transitory processor-readable medium of claim 9 further comprising instructions that, when executed by one or more processors, cause the one or more processors to perform operations including:
receiving, using the second network connection, a message that confirms successful configuration of the television receiver to serve content to the first television customer account over the direct point-to-point network connection.

14. The non-transitory processor-readable medium of claim 9, wherein identifying the second television customer account includes querying a database of television customer accounts.

15. A satellite television receiver comprising:
a receiver interface configured to receive media content from a content provider via a satellite dish located at a residence associated with a second television customer account;
an output interface configured to output media content to a display device;
a network interface configured to establish network connections with remote devices and to transmit and receive data over the network connections;
a plurality of tuners in data communication with the receiver interface, the plurality of tuners configured to provide tuner resources;
one or more processors configured to perform operations including:
establishing a first network connection with a server system using the network interface;
receiving, using the first network connection, instructions to allocate television receiver resources for use by a first television customer and to serve content to the first television customer, wherein:
the instructions are associated with the server system receiving a request to engage an account of the first television customer in an agreement to share the television receiver resources;
the instructions are associated with the server system identifying an account of the second television customer to engage in the agreement; and
the instructions allocate the television receiver resources at least by partitioning the tuner resources so that the first television customer account has allocated thereto a first set of one or more tuners of the plurality of tuners and so that the second television customer account has allocated thereto a second set of one or more tuners of the plurality of tuners;
allocating the television receiver resources for use by the first television customer according to the instructions;
establishing a direct point-to-point network connection with a computing device associated with the first television customer using the network interface;
configuring the television receiver to serve content to the first television customer over the direct point-to-point network connection; and
sending the content to the computing device using the direct point-to-point network connection.

16. The television receiver of claim 15, wherein the first set of one or more tuners is exclusively allocated to the first television customer account and the second set of one or more tuners is exclusively allocated to the second customer account.

17. The television receiver of claim 15, further comprising storage resources, wherein the instructions allocate resources by partitioning the storage resources so that the second television customer associated with the television receiver has allocated thereto a first portion of the storage resources and so that the first television customer has allocated thereto a second portion of the storage resources different than the first portion.

18. The television receiver of claim 15, wherein the one or more processors are further configured to perform operations including:
sending, using the first network connection, a message that confirms successful configuration of the television receiver to serve content to the first television customer.

19. The method of claim 1, wherein the allocation of resources includes partitioning transcoding resources so that the first television customer account has allocated thereto a first portion of transcoding resources of the television receiver and so that the second television customer account has allocated thereto a second portion of transcoding resources of the television receiver.

20. The method of claim 1, wherein the allocation of resources includes partitioning the television receiver resources so that an individual associated with the second television customer account is unable to identify content served to the first television customer account.

* * * * *